US008406235B2

(12) United States Patent
Walton et al.

(10) Patent No.: US 8,406,235 B2
(45) Date of Patent: Mar. 26, 2013

(54) QUALITY OF SERVICE SCHEDULER FOR A WIRELESS NETWORK

(75) Inventors: J. Rodney Walton, Carlisle, MA (US); Sanjiv Nanda, Ramona, CA (US)

(73) Assignee: QUALCOMM Incorporated, San Diego, CA (US)

(*) Notice: Subject to any disclaimer, the term of this patent is extended or adjusted under 35 U.S.C. 154(b) by 1294 days.

(21) Appl. No.: 10/723,346

(22) Filed: Nov. 26, 2003

(65) Prior Publication Data

US 2005/0111462 A1 May 26, 2005

(51) Int. Cl.
*H04L 12/28* (2006.01)
(52) U.S. Cl. ............... 370/395.4; 370/395.43; 455/452.1
(58) Field of Classification Search .................. 370/230, 370/326, 329, 336, 337, 345, 347, 395.4, 370/401, 498
See application file for complete search history.

(56) References Cited

U.S. PATENT DOCUMENTS

| | | | | |
|---|---|---|---|---|
| 5,742,592 A * | 4/1998 | Scholefield et al. | ........... | 370/329 |
| 5,970,062 A * | 10/1999 | Bauchot | ..................... | 370/310.2 |
| 6,016,311 A * | 1/2000 | Gilbert et al. | .................. | 370/280 |
| 6,081,505 A * | 6/2000 | Kilkki | ............................ | 370/230 |
| 6,192,026 B1 * | 2/2001 | Pollack et al. | ................. | 370/203 |
| 6,400,699 B1 | 6/2002 | Airy et al. | ....................... | 370/329 |
| 6,424,624 B1 * | 7/2002 | Galand et al. | .................. | 370/231 |
| 6,567,387 B1 * | 5/2003 | Dulin et al. | .................... | 370/329 |
| 6,577,613 B1 | 6/2003 | Ramanathan | | |
| 6,650,630 B1 * | 11/2003 | Haartsen | ....................... | 370/345 |
| 6,680,930 B2 | 1/2004 | Newberg et al. | | |
| 6,721,302 B1 * | 4/2004 | Alastalo | ........................ | 370/346 |
| 6,728,270 B1 * | 4/2004 | Meggers et al. | ............... | 370/514 |
| 6,834,044 B2 * | 12/2004 | Sugirtharaj et al. | ........... | 370/328 |
| 6,904,283 B2 * | 6/2005 | Li et al. | .......................... | 455/450 |
| 6,947,748 B2 * | 9/2005 | Li et al. | .......................... | 455/450 |
| 6,987,738 B2 * | 1/2006 | Subramanian et al. | ........ | 370/252 |
| 7,068,639 B1 * | 6/2006 | Varma et al. | ................... | 370/347 |
| 7,085,279 B1 * | 8/2006 | Kumar et al. | .................. | 370/401 |
| 7,151,936 B2 * | 12/2006 | Wager et al. | ................... | 455/450 |

(Continued)

FOREIGN PATENT DOCUMENTS

| | | |
|---|---|---|
| EP | 0632671 | 1/1995 |
| EP | 0 804 006 A2 | 4/1997 |

(Continued)

OTHER PUBLICATIONS

Manjanatha et al., "Integrating Differentiated Services with ATM", Telecommunications Systems, Apr. 2002, p. 403-423.*

(Continued)

*Primary Examiner* — Dang Ton
*Assistant Examiner* — Brian O Connor
(74) *Attorney, Agent, or Firm* — James Hunt Yancey, Jr.

(57) ABSTRACT

In one aspect of the invention, a communication device, operable with a plurality of remote devices, and operable with an admission profile comprising a capacity reservation for zero or more remote devices, comprises a scheduler for determining if a remote device corresponding to the data transmission indicator has a capacity reservation in the admission profile and for allocating capacity in accordance with the data transmission indicator. In another aspect, data indicators correspond to one or more service levels. Remaining capacity may be allocated in priority of increasing size of data transmission requirement. In yet another aspect, an admission profile is updated to accept a new flow, characterized by flow parameters, in accordance with available system capacity. Various other aspects are also presented.

33 Claims, 8 Drawing Sheets

U.S. PATENT DOCUMENTS

| | | | |
|---|---|---|---|
| 7,190,684 B2 * | 3/2007 | Cao et al. | 370/335 |
| 7,206,350 B2 * | 4/2007 | Korobkov et al. | 375/260 |
| 7,269,423 B2 * | 9/2007 | Lee et al. | 455/452.1 |
| 7,382,749 B2 * | 6/2008 | Yam | 370/331 |
| 2002/0052205 A1 | 5/2002 | Belostotsky et al. | 455/452 |
| 2002/0093983 A1 * | 7/2002 | Newberg et al. | 370/468 |
| 2005/0111462 A1 | 5/2005 | Walton et al. | |

FOREIGN PATENT DOCUMENTS

| | | |
|---|---|---|
| JP | 2003516095 A | 5/2003 |
| JP | 2003-273880 | 9/2003 |
| JP | 4494416 | 4/2010 |
| WO | WO9507578 A1 | 3/1995 |
| WO | WO0141348 A2 | 6/2001 |
| WO | WO0167714 A1 | 9/2001 |
| WO | WO 02/058412 A1 | 7/2002 |

OTHER PUBLICATIONS

International Search Report—PCT/US04/039690—International Search Authority, European Patent Office, Apr. 1, 2005.

International Preliminary Report on Patentability—PCT/US04/039690—International Search Authority, United States—Feb. 29, 2008.

Written Opinion—PCT/US04/039690—International Search Authority, European Patent Office, Apr. 1, 2005.

Written Opinion—PCT/US04/039690—International Search Authority—United States, Jun. 6, 2007.

Taiwan Search Report—TW093136544—TIPO—Jun. 21, 2011.

* cited by examiner

QUALITY OF SERVICE SCHEDULER FOR A WIRELESS NETWORK

BACKGROUND

1. Field

The present invention relates generally to communications, and more specifically to quality of service scheduling for a wireless network.

2. Background

Wireless communication systems are widely deployed to provide various types of communication such as voice and data. A typical wireless data system, or network, provides multiple users access to one or more shared resources. A system may use a variety of multiple access techniques such as Frequency Division Multiplexing (FDM), Time Division Multiplexing (TDM), Code Division Mulitplexing (CDM), and others.

Example wireless networks include cellular-based data systems. The following are several such examples: (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in "TR-45.5 Physical Layer Standard for cdma2000 Spread Spectrum Systems" (the IS-2000 standard), and (4) the high data rate (HDR) system that conforms to the TIA/EIA/IS-856 standard (the IS-856 standard).

Other examples of wireless systems include Wireless Local Area Networks (WLANs) such as the IEEE 802.11 standards (i.e. 802.11 (a), (b), or (g)). Improvements over these networks may be achieved in deploying a Multiple Input Multiple Output (MIMO) WLAN comprising Orthogonal Frequency Division Multiplexing (OFDM) modulation techniques.

As wireless system designs have advanced, higher data rates have become available. Higher data rates have opened up the possibility of advanced applications, among which are voice, video, fast data transfer, and various other applications. However, various applications may have differing requirements for their respective data transfer. Many types of data may have latency and throughput requirements, or need some Quality of Service (QoS) guarantee. Current systems may offer best-effort scheduling of requests, but in practice ad hoc access to a shared resource may be the norm (i.e. Carrier Sense Multiple Access (CSMA)). Without resource management, the capacity of a system may be reduced, and the system may not operate efficiently. Furthermore, if all traffic is treated identically (including ad hoc access or best-effort), some applications may be limited or may not function at all (i.e. bursty, relatively low latency video streams). There is therefore a need in the art for QoS scheduling in a wireless network.

SUMMARY

In one aspect of the invention, a communication device, operable with a plurality of remote devices, and operable with an admission profile comprising a plurality of time periods and a capacity reservation for zero or more remote devices in each of the plurality of time periods, comprises a scheduler for, during each of the plurality of time periods, for each of a plurality of data transmission indicators, determining if a remote device corresponding to the data transmission indicator has a capacity reservation in the admission profile and for allocating capacity in accordance with the data transmission indicator. In another aspect, data indicators correspond to one or more service levels. In yet another aspect, allocation is made for one service level prior to another service level. Remaining capacity may be allocated in priority of increasing size of data transmission requirement. In yet another aspect, an admission profile is updated to accept a new flow, characterized by flow parameters, in accordance with available system capacity. Various other aspects are also presented.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
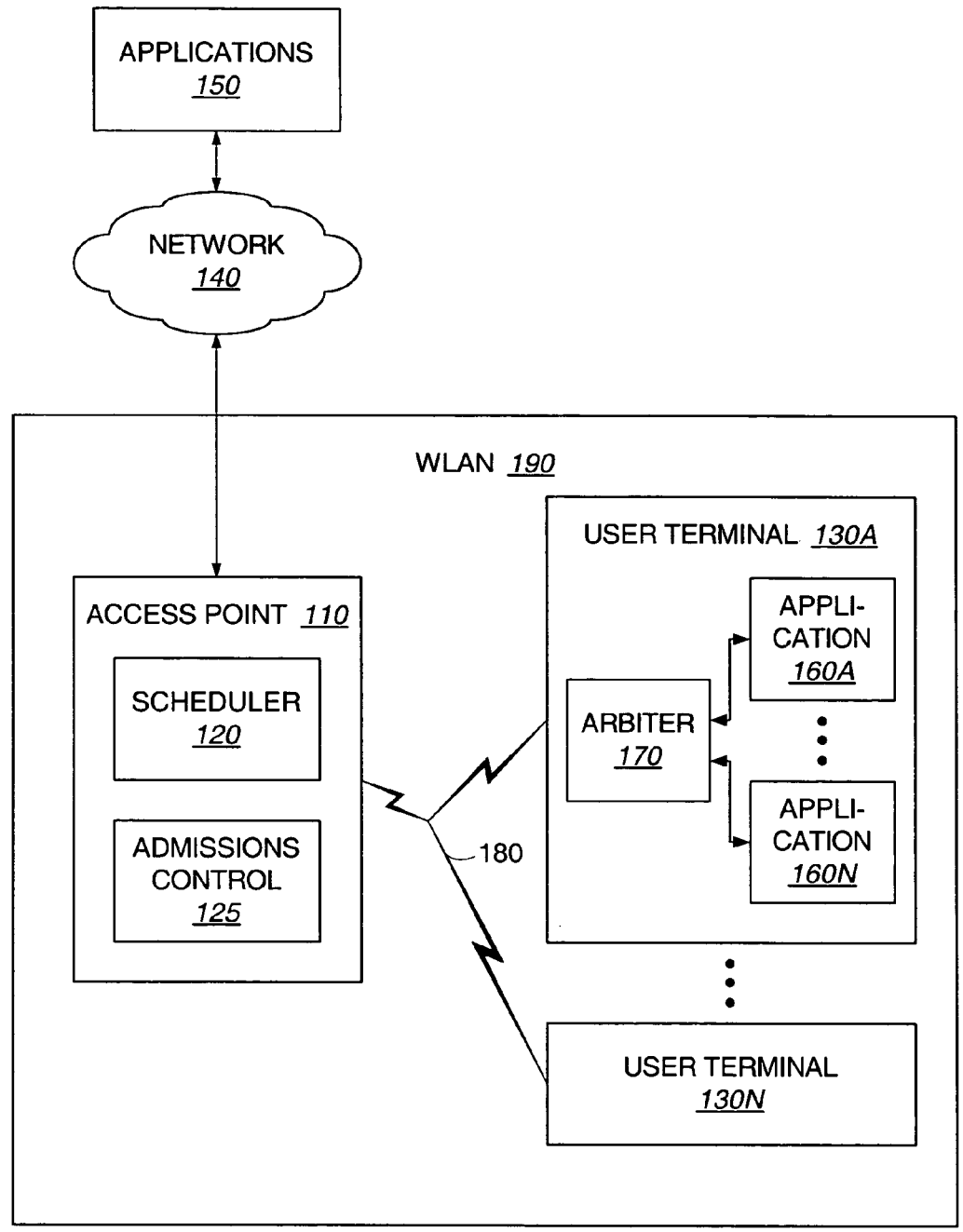
FIG. 1 is an example embodiment of a communication system.

FIG. 1 depicts an example communication system 100. System 100 includes a Wireless Local Area Network (WLAN) 190 comprising Access Point (AP) 110 and User Terminals (UTs) 130A-130N. Access point 120 includes scheduler 120 and admissions control unit 125 (among other components, details not shown). Admissions control unit 125 performs admissions control and scheduler 120 schedules data traffic. Various embodiments are detailed below. Access point 120 is connected to an external network 140, i.e. the Internet, corporate intranet, etc., or other data connection. In the example embodiment, network 140 conforms to the Internet Protocol (IP), and thus traffic communication on the network comprises IP packets. Those of skill in the art will recognize that the principles disclosed herein are not limited as such, and may be deployed with any data network. For illustration, applications 150 are shown connected to external network 140. In general, an application 150 will reside on a server, or any other device, including another user terminal, that may attempt to establish a data connection with one or more user terminals 130 from time to time. Such a connection, also referred to herein as a data flow, or, more simply, a flow, may be established through AP 110, and the flow may be transported to the respective UT, and application embedded within it, via an air interface 180. Similarly, applications running on a user terminal, i.e. applications 160A-160N on UT 130A, may attempt to establish a connection with a device and/or application in another user terminal or connected to the network 140. Again, such a connection may be established through AP 110.

The location of the scheduler 120 and admissions control unit 125 in the access point 110 is for example only. In alternate embodiments, these need not be co-located. In an alternate embodiment, one or more UTs may contain a scheduler and/or admissions control unit. One or more UTs may establish, through signaling, that a designated UT will perform scheduling and/or admissions control. In this case, the designated UT is a de facto access point. The designated UT may change over time. One or more UTs may have a connection to an external network 140. Alternately, there may be no connection to an outside network from WLAN 190. Also contemplated are managed peer-to-peer connections. For example, an access point (or designated UT) may manage admissions control and/or scheduling for a connection between two other user terminals. In this fashion, the data transmission occurs directly between the peers, and only the control signaling such as requests and grants is transmitted to and received from the managing access point (or designated UT). Myriad configurations including these options and others will readily adapted by those of skill in the art in light of the teachings herein. An example embodiment comprising an access point and one or more user terminals, connected in a star topology, is often used an example herein. It is a useful example to describe the various aspects of the present invention, but the present invention is not limited as such.

WLAN 190 may handle various types of traffic, including real-time services such as voice, video on demand, multicast video, gaming applications, and standard TCP/IP web browsing, for example. The characteristics of flows of data applications may differ. For example, various flows may have differing latency and/or error tolerance requirements. Voice data is generally considered to require low latency, to avoid delay that would be perceptible to the listener. However, various voice encoding schemes are known in the art which allow "lossy" transmission of voice data, i.e., the speech quality is not greatly affected by a consistent low level frame error rate. On the other hand, a file download, for example, may not be as sensitive to latency. However, it may be imperative that the file be received with no error. In order to provide acceptable performance to an array of anticipated applications, scheduler 120 provides Quality of Service (QoS) management.

In an example embodiment, traffic is segmented into two groups: QoS sensitive traffic and Best-Effort Traffic (BET). Traffic with stringent delay and/or bandwidth constraints is placed in the QoS sensitive group. The remainder is placed in the best-effort group. Scheduler 120 manages the QoS sensitive traffic using a bandwidth reservation scheme, detailed further below. Admissions control unit 125 employs admissions control to accept or reject a proposed flow based on the characteristics of the flow and the amount of resources available. Best-effort traffic is managed using a simple round-robin queuing scheme. These, and alternate embodiments, are detailed further below.

In the example embodiment, air interface 180 is a Multiple Input Multiple Output (MIMO) WLAN using Orthogonal Frequency Division Multiplexing (OFDM). Alternatively, various other air interface schemes may be used, including FDM, CDM, TDM. Other techniques such as spatial diversity, may be used to allow multiple users to access one or more common interfaces. Various standards and designs for air interfaces have defined one or more channel types for transmission and reception on a shared communication resource. Typically, one or more control channels and one or more data channels are prescribed. Often a broadcast channel is defined for signaling to more than one destination simultaneously (e.g., a message on the forward link). Often a random access channel is deployed for devices to gain access to the network (e.g., UTs initiating communication on the reverse link). Any configuration of data and/or control channels may be deployed within the scope of the present invention. Regardless of which channel, or the channel type, users (i.e. applications 150 connected via network 140, or user terminals 130) make requests for access to the shared resource. The scheduler allocates the resource using one or more of the techniques detailed below. One or more users are then granted access to the shared resource. Those of skill in the art will readily adapt the principles disclosed herein to various communication systems.

Figure 2:
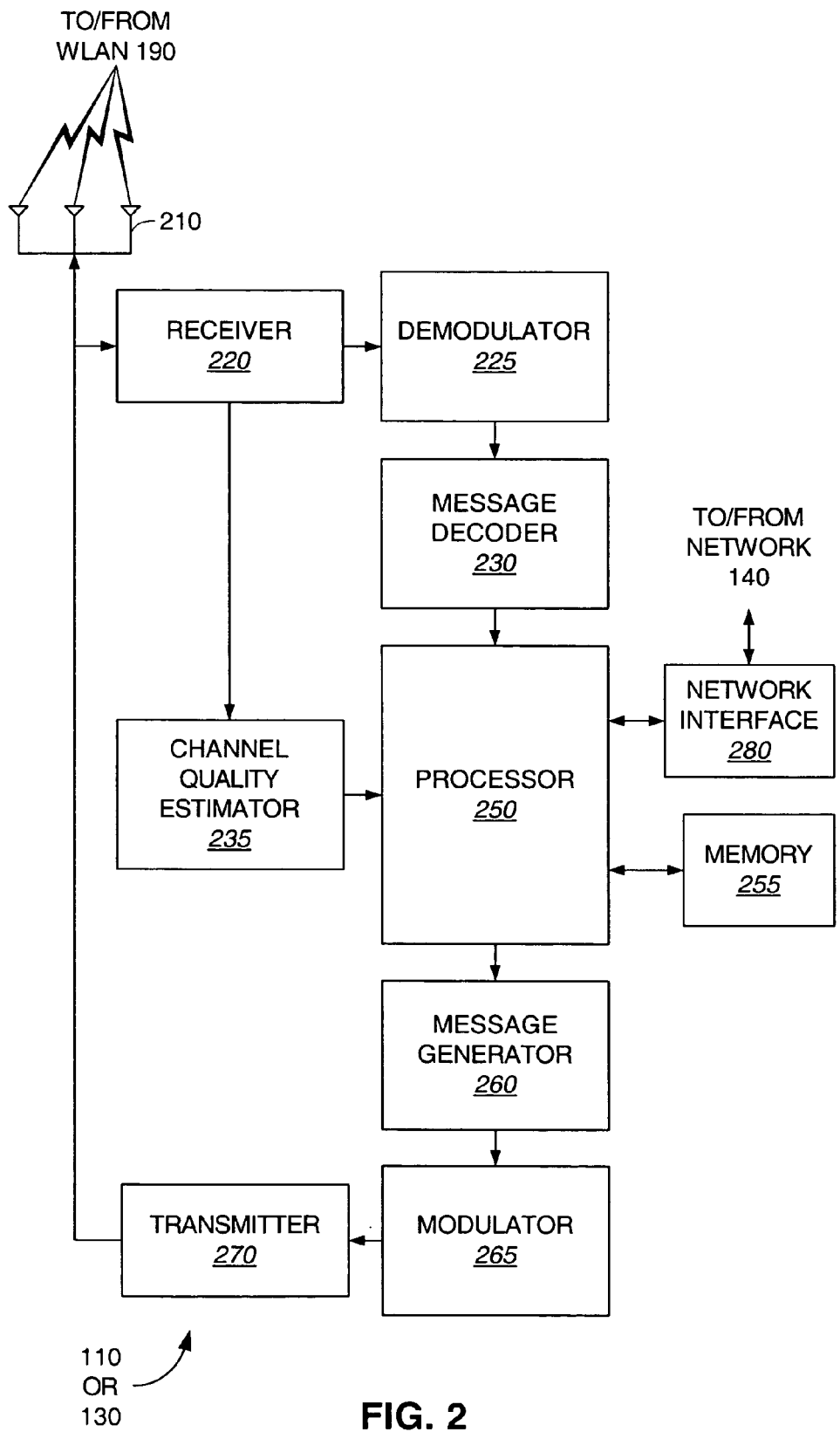
FIG. 2 is an example embodiment of a communication device, i.e. an access point or a user terminal.

FIG. 2 is a block diagram of an example communication device, such as a user terminal 130 or access point 110. The blocks depicted in this example embodiment will generally be a subset of the components included in either a user terminal 130 or access point 110. Those of skill in the art will readily adapt the embodiment shown in FIG. 2 for use in any number of access point or user terminal configurations. Note that the use of the terms forward and reverse links are used for discussion purposes only. When an access point 110 functions analogously to a base station and user terminals interact in a typical star topology, the terms forward and reverse link are apt. However, as described above, the scope of the present invention encompasses ad hoc networks (wherein one of any of a number of user terminals 130 sets up as a de facto access point 110), managed peer-to-peer connections, and the like. Those of skill in the art will recognize the use of these terms does not limit the scope of the invention, but may serve as conventions suitable for the context in which they are used.

Signals are received at antenna 210 and delivered to receiver 220. Antenna 210 may comprise one or more antennas. Receiver 220 performs processing according to the WLAN 190 system, which may correspond with one or more wireless system standards, such as the standards listed above. Receiver 220 performs various processing such as Radio Frequency (RF) to baseband conversion, amplification, analog to digital conversion, filtering, and the like. Various techniques for receiving are known in the art. Receiver 220 may be used to measure channel quality of the forward or reverse link, although a separate channel quality estimator 235 is shown for clarity of discussion. A channel quality estimator 235 may be used to determine the quality of the channel, and therefore to estimate the supportable data rate. When a communication device knows the amount of data it has to send, or required duration of transmission, and the supportable data rate, it can determine the amount of resources its needs and make a request accordingly. In the example embodiment, a communication device determines the number of OFDM symbols required to transmit. Those of skill in the art will recognize that there are many alternatives that may be deployed in order to determine the amount of shared resources required to transmit a known amount of data over a varying channel. As one alternative, a request for transmission may include the amount of data and a channel quality indicator. The scheduler could, in turn, make a determination of the amount of OFDM symbols to grant based on these factors.

Signals from receiver 220 are demodulated in demodulator 225 according to one or more communication designs or standards. In an example embodiment, a demodulator capable of demodulating MIMO OFDM signals is deployed. In alternate embodiments, alternate standards may be supported, and embodiments may support multiple communication formats. Demodulator 230 may perform RAKE receiving, equalization, combining, deinterleaving, decoding, and various other functions as required by the format of the received signals. Various demodulation techniques are known in the art. In an access point 110, demodulator 225 may demodulate according to the reverse link. In a user terminal, demodulator 225 may demodulate according to the forward link. Both the data and control channels described herein are examples of channels that can be received and demodulated in receiver 220 and demodulator 225. Demodulation of the forward data channel may occur in accordance with signaling on the control channel, as described above.

Message decoder 230 receives demodulated data and extracts signals or messages directed to the user terminal 130 or access point 110 on the forward or reverse links, respectively. Message decoder 230 decodes various messages used in setting up, maintaining and tearing down a data session on a system. Messages may include requests for transmission, transmission grants, or any number of control channel messages. Various other message types are known in the art and may be specified in the various communication standards or designs being supported. The messages are delivered to processor 250 for use in subsequent processing. Some or all of the functions of message decoder 230 may be carried out in processor 250, although a discrete block is shown for clarity of discussion. Alternatively, demodulator 225 may decode certain information and send it directly to processor 250 (a single bit message such as an ACK/NAK or a power control up/down command are examples).

Channel quality estimator 235 is connected to receiver 220, and used for making various power level estimates for use in procedures described herein, as well as for use in various other processing used in communication, such as demodulation. Channel quality estimator 235 is shown as a discrete block for clarity of discussion only. It is common for such a block to be incorporated within another block, such as receiver 220 or demodulator 225. Various types of signal strength estimates can be made, depending on which signal or which system type is being estimated. In particular, for a MIMO channel (M transmit and N receive antennas), the channel estimate may be an M×N matrix. In general, any type of channel quality metric estimation block may be deployed in place of channel quality estimator 235 within the scope of the present invention.

Signals are transmitted via antenna 210, which may include a plurality of antennas. Transmitted signals are formatted in transmitter 270 according to one or more wireless system standards or designs, such as those listed above. Examples of components that may be included in transmitter 270 are amplifiers, filters, digital-to-analog (D/A) converters, radio frequency (RF) converters, and the like. Data for transmission is provided to transmitter 270 by modulator 265. Data and control channels may be formatted for transmission in accordance with a variety of formats. Data for transmission on the forward link data channel may be formatted in modulator 265 according to a rate and modulation format indicated by a scheduling algorithm in accordance with a C/I or other channel quality measurement. Examples of components that may be incorporated in modulator 265 include encoders, interleavers, spreaders, and modulators of various types.

Message generator 260 may be used to prepare messages of various types, as described herein. For example, request messages may be generated to request access to the air interface for transmission. Grant messages may be generated for transmission in response to request messages, the grant message containing an allocation of the shared resource available to the requesting user terminal, for example. Various types of control messages may be generated in either an access point 110 or user terminal 130.

Data received and demodulated in demodulator 225 may be delivered to processor 250 for use in data communications, as well as to various other components. Similarly, data for transmission may be directed to modulator 265 and transmitter 270 from processor 250. For example, various data applications may be present on processor 250, or on another processor included in the communication device 110 or 130 (not shown). An access point 110 may be connected, via network interface 280, to one or more external networks, such as the Internet, or network 140. A user terminal 130 or access point 110 may include a link to an external device, such as a laptop computer (not shown).

A scheduler, such as scheduler 120, described above, may reside in processor 250. An admissions control unit 125 may reside in processor 250. Various embodiments of these are detailed further below.

Processor 250 may be a general-purpose microprocessor, a digital signal processor (DSP), or a special-purpose processor. Processor 250 may perform some or all of the functions of receiver 220, demodulator 225, message decoder 230, channel quality estimator 235, message generator 260, modulator 265, transmitter 270, or network interface 280, as well as any other processing required by the communication device. Processor 250 may be connected with special-purpose hardware to assist in these tasks (details not shown). Data or voice applications may be external, such as an externally connected laptop computer or connection to a network, may run on an additional processor within communication device 110 or 130 (not shown), or may run on processor 250 itself. Processor 250 is connected with memory 255, which may be used for storing data as well as instructions for performing the various procedures and methods described herein. Those of skill in the art will recognize that memory 255 may be comprised of one or more memory components of various types, that may be embedded in whole or in part within processor 250. A memory 255 may be used for deploying one or more queues, as described herein. Memory 255 is suitable for storing one or more admission profiles, detailed further below.

In the example embodiment, a single Media Access Control (MAC) frame is deployed that may support multiple UT flows as well as multiple flows per UT. A superframe is defined that comprises a plurality of MAC frames. In this example, the number of MAC frames in a superframe is 16.

In the example embodiment, a Control Channel (CCH) is transmitted at the beginning of each MAC frame containing scheduling information for all active flows on both the forward and reverse link segments of the current MAC frame. Forward link scheduling is facilitated using link data rate information feedback from UTs. Reverse link scheduling is facilitated using queue status information and implicit link data rate information provided by UTs (e.g., the amount of capacity requested is correlated with both data demand and link quality). A dormant UT may use a Random Access Channel (RCH) to request system resources. An access point may also poll user terminals, as an option. Note that, in the case of a managed peer-to-peer connections, all transmissions are between peer UTs and, from the perspective of the scheduler, may be treated as part of reverse link scheduling.

It is generally desirable to minimize the delay between the time link status information is received at the access point and the time the resulting scheduling information is transmitted to UTs on the CCH. Excess delay can result in the data rates assigned in a given MAC frame to become obsolete if the Radio Frequency (RF) channel changes before the resulting transmission occurs. In the example embodiment, a target delay of one MAC frame (approximately 2 ms) is used as an objective.

In the example embodiment, forward link data for multiple UTs are stored in queues in the access point. The queues may or may not be identified by data class type. Alternately, respective queues may be maintained in applications connected through network 140. In this example, reverse link data is stored in queues in respective user terminals. Note that use of the terms reverse link and forward link do not preclude the use of peer-to-peer connections (where data flows between peers, and not to or from the access point, or managing UT), or any of the other alternatives disclosed herein. Requests for access to the shared communication resource may identify the type of data for which the request is made, or may be simply a single request that may accommodate multiple classes. In the example embodiment, a request is made for a number of OFDM symbols. In the alternative, a request may be made for any portion of the shared resource (i.e. time slots, channels, power, etc.) Requests may reflect that the requesting body has adjusted the request size based on amount of data and supportable bit rate, due to changing channel conditions. An advantage of this type of request is that the scheduler need not have access to measurements of the channel between peers in managed peer-to-peer situations, nor the need to explicitly determine the quality of the reverse link channel (i.e., in situations in which the forward link and reverse link are not necessarily symmetrical). Alternatively, a request may not specify the amount of the resource desired, but rather the amount of data and some channel quality indicator. Any type of request, or combination of request types, may be accommodated by the scheduler.

For clarity, it may be assumed that the various user terminals are fixed, although the scope of the present invention is not limited as such. Handoff between multiple access points by a mobile UT is not discussed for clarity of discussion. Whether mobile or not, the wireless channel between any UT and the AP may vary with time due to various causes of interference. Thus, the capacity of the forward and/or reverse link for any UT may fluctuate.

As described above, UT flows are placed into one of two categories, namely best-effort and QoS sensitive. Best-effort service is provided for latency insensitive flows. Bandwidth reservation, coupled with admissions control, is used for QoS sensitive flows. Independent control of latency is also facilitated by scheduler 120. QoS sensitive flows are allocated a nominal fixed fraction of the resources, either on a per MAC frame basis or in a distributed manner over a superframe (i.e. 16 MAC frames). The nominal allocation is a function of the source's traffic profile that is statistically characterized by a set of parameters that may include the average rate, maximum rate, burstiness, maximum latency, etc. The admissions control unit 125 uses these and other parameters to determine the nominal rate and schedule required to satisfy the QoS requirements of a flow.

As detailed further below, the scheduling task is complicated by the fact that the source's instantaneous data rate and the bit rate supported by the channel can both vary. Many data applications have bursty traffic profiles. For example, MPEG (Moving Picture Experts Group-International Standards Organization/International Electrotechnical Commission) encoded video can exhibit peak to average ratios approaching 10:1. The signal to noise ratio (SNR) of the wireless channel may vary widely due to shadowing and interference (whether or not the UT is mobile or fixed), and thus the supportable data rate of the link also varies widely.

QoS guarantees may be met and good system efficiency achieved by using an appropriate admissions policy coupled with statistical multiplexing. When a flow requires resources over a nominal allocation, it may be allocated additional resources, provided they are available. When a large number of flows are supported, statistical multiplexing gains may be substantial, and good system efficiency results.

Various embodiments of admissions control and scheduling are detailed below. A summary of one example embodiment is as follows. Unused resources in a MAC frame are made available to other flows. QoS sensitive flows whose instantaneous requirements exceed their nominal allocations are served first. Unused resources are distributed in a manner that maximizes the number of flows meeting their QoS requirements. If, after serving the QoS sensitive flows, there are remaining resources, the best effort flows are served next. Unused resources may be distributed among best effort flows in a round-robin manner. A fairness policy may optionally be deployed.

Figure 3:
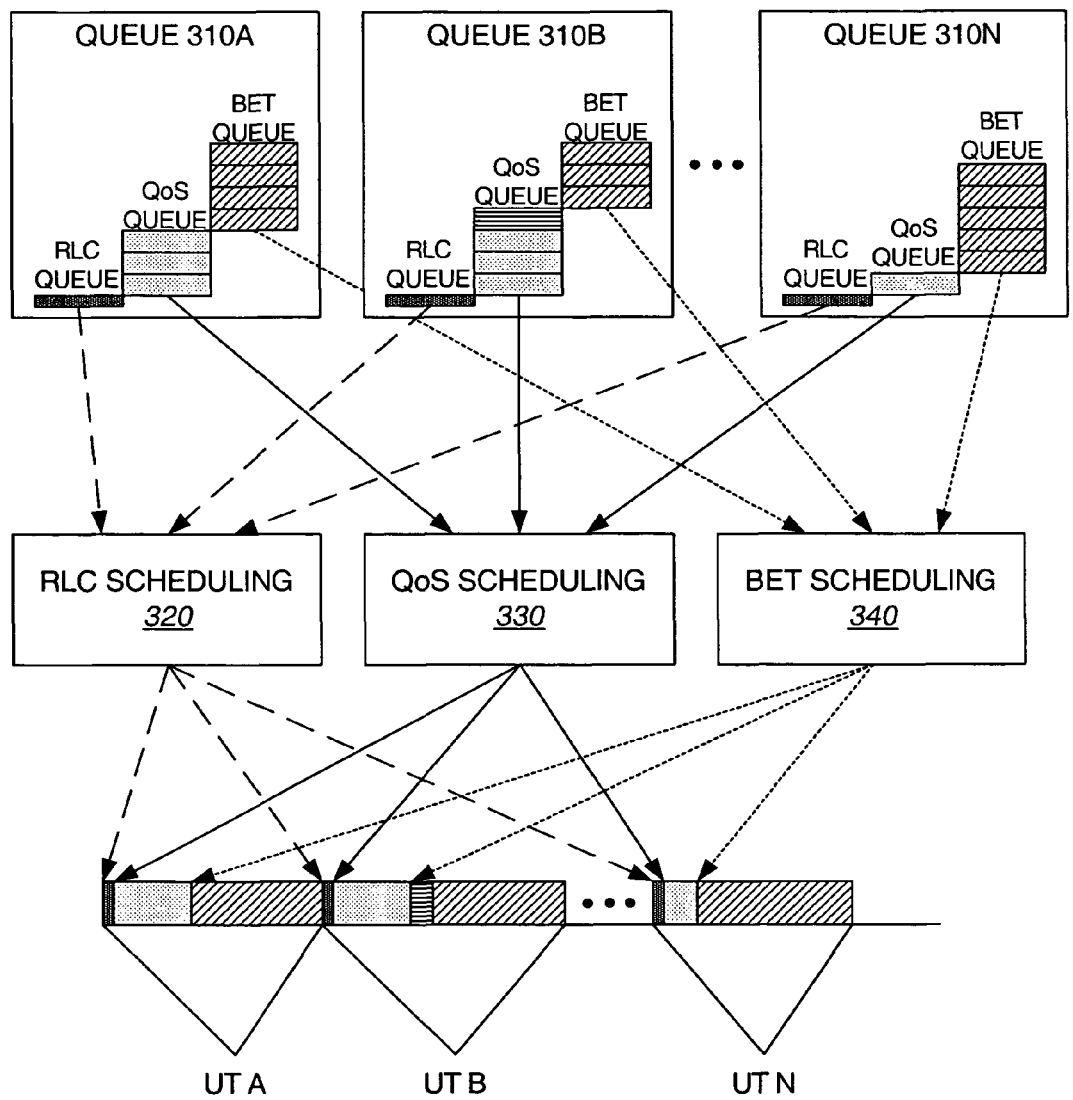
FIG. 3 illustrates scheduling for data of three classes for a plurality of user terminals/applications.

FIG. 3 illustrates scheduling for data of three classes for a plurality of user terminals/applications. In an example embodiment, traffic is classified intro three groups by the scheduler. Prioritization within each group is handled differently. In this example, each UT manages separate queues for each traffic class. UTs may have multiple flows in each traffic class. In the example embodiment, queues are managed as byte-oriented buffers. Bytes in a queue are served using a first-in first-out (FIFO) discipline by the scheduler. Any type of queue and access order may be deployed in alternate embodiments.

The first class of traffic, Radio Link Control (RLC) traffic is associated with the management of a UT's radio link connection and is generally quite time sensitive. As such, in this example, RLC traffic has the highest priority of all traffic classes. The scheduler first allocates resources to UTs with pending RLC traffic. RLC traffic typically constitutes a small fraction of the total resources. As such, for clarity of discussion, except where noted below, the following embodiments are described with respect to the next two traffic classes. Those of skill in the art will readily adapt any of the embodiments described herein to accommodate a third traffic class, such as RLC.

The second class of traffic, Quality of Service (QoS) sensitive flows, require more stringent delivery parameters, to meet needs such as maximum latency and/or capacity for carrying bursty data. QoS sensitive flows may be allocated a nominal fraction of the total resource through the admissions control unit. QoS traffic has priority over Best Effort Traffic (BET), the third class of traffic. Flows requesting substantially more resources than their nominal allocation are more likely to receive degraded service. QoS traffic may constitute a substantial fraction of the total resources, depending on how the system is administered.

The third class, BET, has the lowest priority. A variety of techniques for handling BET are detailed below.

In FIG. 3, a plurality of queues, 310A-310N, are maintained for a plurality of user terminals UT A-UT N. Note that these queues may be maintained in an access point 110, for forward link transmission. In such a case, the access point would know exactly which queues contain which class of data. Analogous queues may be maintained in each of the respective user terminals 130A-130N. User terminals may or may not indicate to an access point in a request for transmission which class or classes of data are included in the transmission request. Various example embodiments including both situations, and a combination of both, are detailed below. In general, one of skill in the art will be able to deploy a scheduler for scheduling either the forward or reverse links, or both, in light of the teaching herein.

RLC scheduling function 320 schedules the queued RLC data from each of the respective RLC queues. QoS scheduling function 330 schedules the respective QoS queues. Similarly, BET scheduling function 340 schedules the BET queues, which are the lowest priority. The resultant transmissions are shown for UT A-UT N at the bottom of the figure. Note that, as an illustrative exception, a portion of the QoS queue 310B is scheduled in the BET portion for that UT, as opposed to the QoS portion. This illustrates an example of a request exceeding the nominal QoS allocation. In this case, the BET allocation was sufficient to meet any remaining QoS traffic needs, and no QoS degradation will be experienced. FIG. 3 serves as but one example of scheduling and data classes. Various embodiments are detailed further below.

Two basic aspects are detailed below: admissions control and packet scheduling. An example system employs an admissions control unit to control the acceptance or denial of service for QoS sensitive traffic. The scheduler may keep track of the admitted flows and attempt to maintain their negotiated rates of service.

Admissions Control

If desired, a maximum number of slots (i.e. OFDM symbols), $F_R$, may be reserved for QoS sensitive traffic. ($F_R$ may also be set to the total number of available slots.) The remainder, if any, $F_B$, is reserved for best effort traffic. The total available resources (not including RLC or similar control class traffic, as discussed above) are given by $F_A$:

$$F_A = F_R + F_B \tag{1}$$

$F_R$ may be used by the admissions control unit to determine whether or not to commit resources to a flow requesting a specified QoS. The admissions control unit may employ various per-flow variables to determine whether or not to admit a flow. Following are some examples, and others will be clear to those of ordinary skill in the art.

Various source characterization variables may be specified. For example, a bandwidth reservation request $a_r(i)$ may be specified for flow i, which is a data rate requirement in bits/second and may be computed based on the QoS parameters associated with the flow. A leaky bucket model may be assumed when describing the source, i.e. an average sustainable rate, peak rate, and burstiness. A maximum latency of the source $d_{max}(i)$ may also be specified to derive an efficient method of scheduling the flow.

Various link characterization variables may also be specified. For example, a mean achievable data rate, $\bar{r}(i)$, observed on the link may be identified (with separate variables maintained for the forward and reverse links). $\bar{r}(i)$ is the average value of the achievable rate associated with the physical layer for each terminal and may be determined during registration/calibration. This value may fluctuate with time based on the link conditions (i.e. fading, path loss, interference, etc.).

In this example, flows in the QoS group are assigned a nominal slot allocation by the admission control unit based on these parameters. The nominal allocation guarantees that a fixed number of slots will be allocated in a given time interval (i.e. an integer multiple of frames). Depending on these parameters, the nominal allocation may result in a fixed number of slots per MAC frame, or a fixed number of slots per superframe (i.e. 16 MAC frames).

If the source data rate exceeds the rate negotiated or the link data rate falls below the negotiated rate, the flow will require additional slots in order to meet its requirement. In these cases, statistical multiplexing may provide adequate flow margin to meet per-flow shortfalls. The efficiency of statistical multiplexing is proportional to the number of users sharing the resource. In general, more users result in greater efficiency.

In this example, the allocation assigned to flow i is given by:

$$\phi(i) = \min(\phi_{max}, \bar{\phi}(i)) \tag{2}$$

where $$\bar{\phi}(i) = \left\lceil \frac{a_r(i)}{\bar{r}(i)} \right\rceil \tag{3}$$

Note that $\lceil x \rceil$ implies x rounded up, and $\phi_{max}$ is an upper bound imposed on the maximum allocation permitted for a single flow. Those of skill in the art will recognize that, in some embodiments, the smaller $\phi_{max}$ is made, the greater the system's efficiency. However, in certain circumstances, limiting $\phi_{max}$ may potentially restrict the coverage area for higher rate services. Those of skill in the art will adapt $\phi_{max}$, in accordance with this tradeoff, in deploying various embodiments.

The total allocation is the sum of the allocations for each flow in the QoS group, $N_a$:

$$F_R = \sum_{i=1}^{N_a} \phi(i) \tag{4}$$

The requirement for a given flow Is given by:

$$\varphi(i) = \left\lceil \frac{b_r(i)}{r(i)} \right\rceil \tag{5}$$

where $b_r(i)$ is the instantaneous bit rate of the source and $r(i)$ is the observed data rate on the link. The total requirement is given by:

$$D = \sum_{i=1}^{N_a} \varphi(i) \tag{6}$$

A service outage occurs whenever the total requirement exceeds the total allocation. In an example embodiment, the admissions control algorithm denies service to any flow that causes the probability of $D > F_R$ to exceed an outage threshold (e.g. 0.1%). Note that an outage does not necessarily translate into an outage for all flows. The outage probability associated with a specific flow depends upon the other instantaneous flow requirements.

In an example admissions control embodiment, each UT with a QoS flow is assigned a duty factor and MAC frame phase parameter. The duty factor indicates the periodicity associated with the scheduling interval for the flow (e.g. 1 slot every 10 MAC frames). The phase parameter indicates the MAC frame indices for which transmission for the flow occurs (e.g. 0 to 15). When handling multiple QoS flows per UT, the flow with the highest duty factor may dictate the schedule for all QoS flows associated with the UT.

Figure 4:
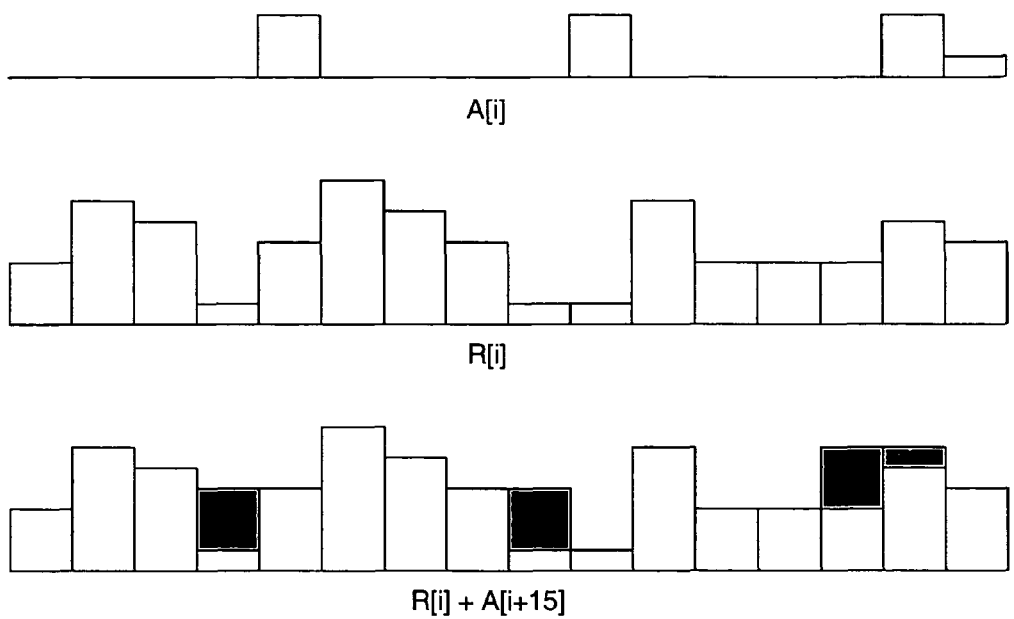
FIG. 4 illustrates an admissions control example.

Consider the following example, graphically illustrated in FIG. 4. Assume a rate request for a flow translates into a requirement of 375 slots per superframe (i.e. 32 ms). To satisfy the rate parameters for this flow, an average of 23.4375 slots per MAC frame are allocated. Further assume the flow has a maximum latency parameter of $d_{max}(i) = 5$ MAC frames (i.e. 10 ms). The following is a permitted allocation:

| | |
|---|---|
| MAC Frame #4 | 117 slots |
| MAC Frame #9 | 117 slots |
| MAC Frame #14 | 117 slots |
| MAC Frame #15 | 24 slots |

The admissions control unit constructs an allocation vector over the 16 MAC frames in a superframe:

$$A[i]=\{0,0,0,0,117,0,0,0,0,117,0,0,0,0,117,24\}. \quad (7)$$

Let R[i] be the aggregate slot allocation vector for MAC frames 0, 1, ... 15. The admissions control unit may then determine a phase shift, $k_A$, of A[i] designed to reserve availability for subsequent allocations. FIG. 4 illustrates an example R[i], and the result of a shift in A[i] of $k_A$=15 summed with R[i].

Those of skill in the art will recognize various criteria that may be employed in determine whether to accept a flow, and how to allocate an accepted flow. For example, the capacity of a frame may allocated to both QoS and BET traffic. The allocation may be fixed per frame, or may be adjustable to increase packing efficiency. For each allocation, there may be a tradeoff between packing efficiency and the ability to accept additional flows. Those of skill in the art will adapt various embodiments to make allocation decisions based on various factors, including, for example, statistical properties of expected number of QoS flows at a given time, and the expected parameters of flows (i.e. phase and duty factor, etc.).

Furthermore, those of skill in the art will recognize the potential tradeoff between achieved efficiency and QoS maintenance. For example, consider a flow whose rate and maximum latency allows it to be satisfactorily transmitted during one slot every $4^{th}$ MAC frame, achieving an 80% packing efficiency. Alternatively, the flow could be transmitted during one slot every two MAC frames with a 40% slot packing efficiency. The first schedule may be preferable from a system efficiency perspective. However, the second schedule may be better from a QoS perspective since it may provide additional link margin to handle a decrease in link data rate. An admission control unit may be deployed with the ability to balance the desired level of efficiency and/or QoS maintenance in establishing flow schedules.

Figure 5:
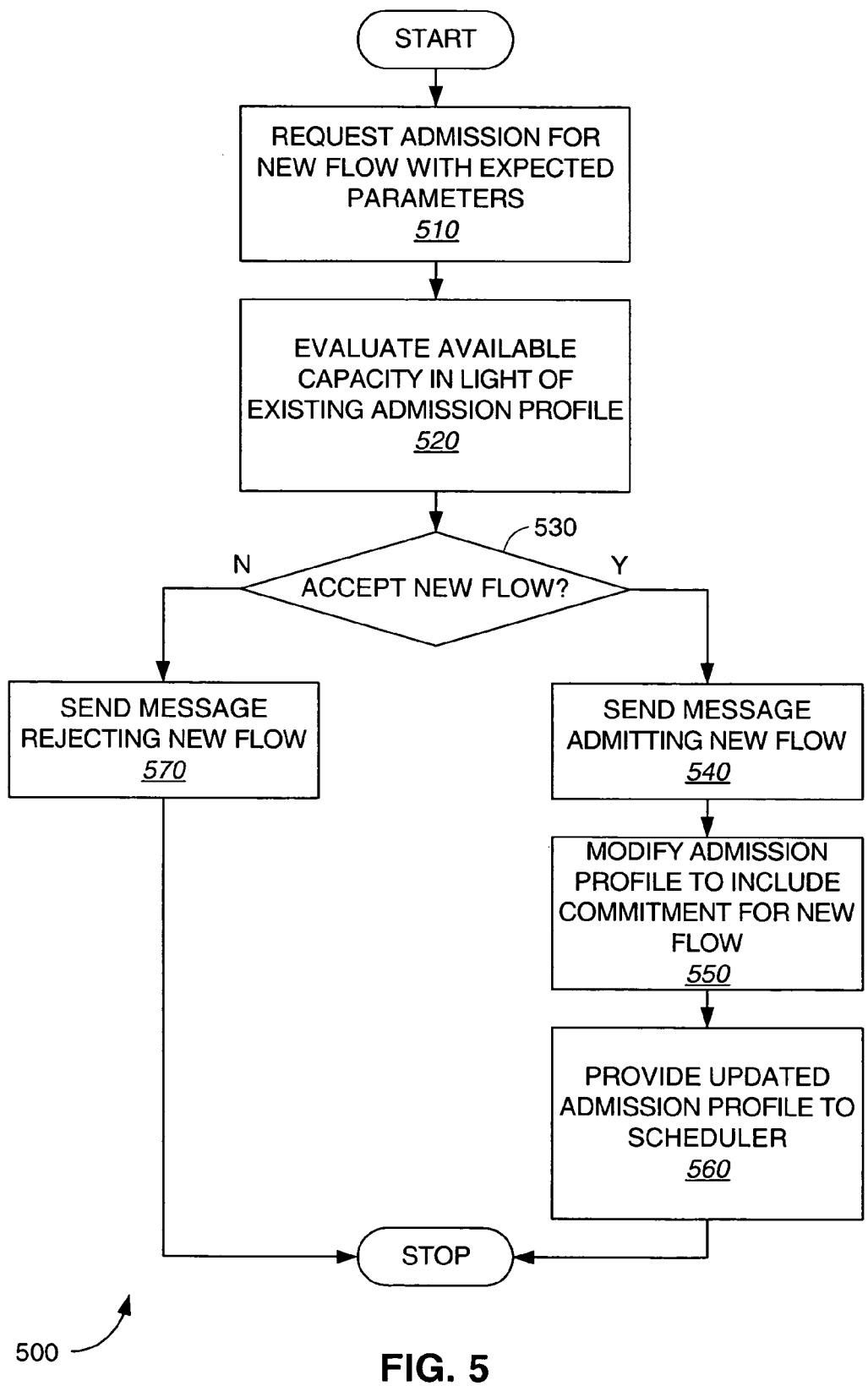
FIG. 5 is a flowchart of an example admissions control unit.

FIG. 5 is a flowchart of an example admissions control unit 500. In block 510, an application makes an admission request for a new QoS flow. The request contains parameters for expected characteristics of the flow. Examples of such characteristics are described above. Recall that, in general, the admissions control unit makes admission decisions on expected parameters (i.e. averages). However, the scheduler will be allocating capacity based on real-time data transmission requests, which are a function of the actual amount of data and the present state of the time-varying communications channel.

In block 520, the admissions control unit evaluates the availability of capacity for the requested new flow, based on the existing admission profile, which is indicative of the expected data requirements for the flows already admitted. An example manner of determining how to incorporate a requested flow in light of an existing profile is described above with respect to FIG. 4. In decision block 530, if there is sufficient capacity to accommodate the throughput requirements, as well as any QoS requirements (such as duty factor and latency requirements), proceed to block 540. In block 540, send a message to the requesting application indicating the new flow has been admitted. The requesting application may then initiate whatever process or processes are associated with the new flow.

If there is not sufficient capacity, in decision block 530, proceed to block 570. In block 570, send a message rejecting the new flow to the requesting application. Then the process may stop.

In block 550, after a new flow has been admitted, modify the admission profile to include the commitment for the new flow. Those of skill in the art will recognize that there are myriad ways of representing an admission profile within the scope of the present invention. In the example embodiment, capacity is allocated in terms of OFDM symbols. A MAC superframe, consisting of 16 MAC frames, is deployed. The admission profile includes a commitment, or contract, for a number of OFDM symbols in each MAC frame allocated to each admitted flow. In alternate embodiments, other units of capacity may be allocated, such as time slots in a TDM system, power and/or codes in a CDM system, etc. An admission profile may be at varying levels of time granularity, and may be of varying period length. Furthermore, a commitment for a flow need not be fixed to specific frames. For example, a flow may be allocated a certain number of symbols within a range of frames as part of its admission profile commitment. The scheduler may have flexibility over which frames to allocate to the flow, so long as its contractual minimum is met within the specified range.

In block 560, provide the updated admission profile to the scheduler. Any means for making the admission profile available to the scheduler fall within the scope of the present invention. For example, the scheduler may simply be able to access the admission profile in memory shared with the admissions control unit. In an alternate embodiment, the admission profile may be signaled or sent in a message to the scheduler. The entire admission profile need not be transmitted, as addition of new flows may be combined with previously admitted flows to form the current admission profile. Then the process may stop. Note that process may be repeated as often as desired to allow applications to reserve bandwidth with the scheduler.

Note further that flows may also be removed from the admissions profile, as will readily apparent to those of skill in the art. The details are not shown in FIG. 5. An application may send a message indicating a flow is no longer necessary. Alternatively, a new request may be sent modifying a flow. As another option, a scheduler may direct the admissions control unit to remove a flow if the application is not adhering to its contracted parameters. In such a case, the flow may be cut off completely, or relegated to a best effort status. In such a case, an application may be forced to terminate the process associated with the flow, if the QoS minimums are not being met. That application may re-request admission for a flow, with adjusted parameters, to establish a QoS maintained service with the scheduler (i.e. service renegotiation).

QoS Scheduling

In a basic embodiment employing QoS scheduling, a request for transmission (i.e. access) is made for a flow. The request need not identify the type of traffic for transmission, it may be simply an indication of the amount. In this situation, the requesting application may order the data in its queue in accordance with priority (i.e. QoS before BET). Note that in an embodiment in which the scheduler is co-located with one or more queues, such as in an access point with queues for forward link traffic, or in a UT acting as an access point or managing one or more peer-to-peer connections, as described above, a request for transmission may not be necessary, as data in the various co-located queues is indicative of the need for transmission. In a basic embodiment, the type of data in the queue may not be known, in which case the sending application should order the data sent to the queue in accordance with priority. In these basic scenarios, QoS scheduling may be accommodated using the contracted commitments indicated in the admissions profile.

Additional functionality and control may be available when additional information about the queued data is available. For example, when the scheduler is co-located with one or more queues associated with various flows, and the queues are separated or otherwise provide an indication of data class (i.e. QoS or BET), the scheduler knows how much data, and of what type, is awaiting transmission. The scheduler may prioritize data of different types in this scenario. An example embodiment may be an access point that maintains queues for forward link flows. Note that the applications producing these flows may need to indicate the class of data if more than one class of data is directed from a source to a UT. In such a scenario, reverse link scheduling may be basic, as just described, while forward link scheduling may account for various data classes (described further below).

Optionally, a request for transmission may indicate the class of data. If more than one class awaits transmission (i.e., from a UT), a request may indicate how much of each type awaits transmission. In this case, the scheduler may account for class of data as it does with co-located queues.

Any combination of request types and queues may be deployed within an embodiment. A scheduler may simply take advantage of specific knowledge when it is available, and proceed without such information when it is not available. In any embodiment, a scheduler may utilize the admission profile, as contracted between the various applications/flows and the admissions control unit, as described above, to realize QoS scheduling benefits, as described herein.

Figure 6:
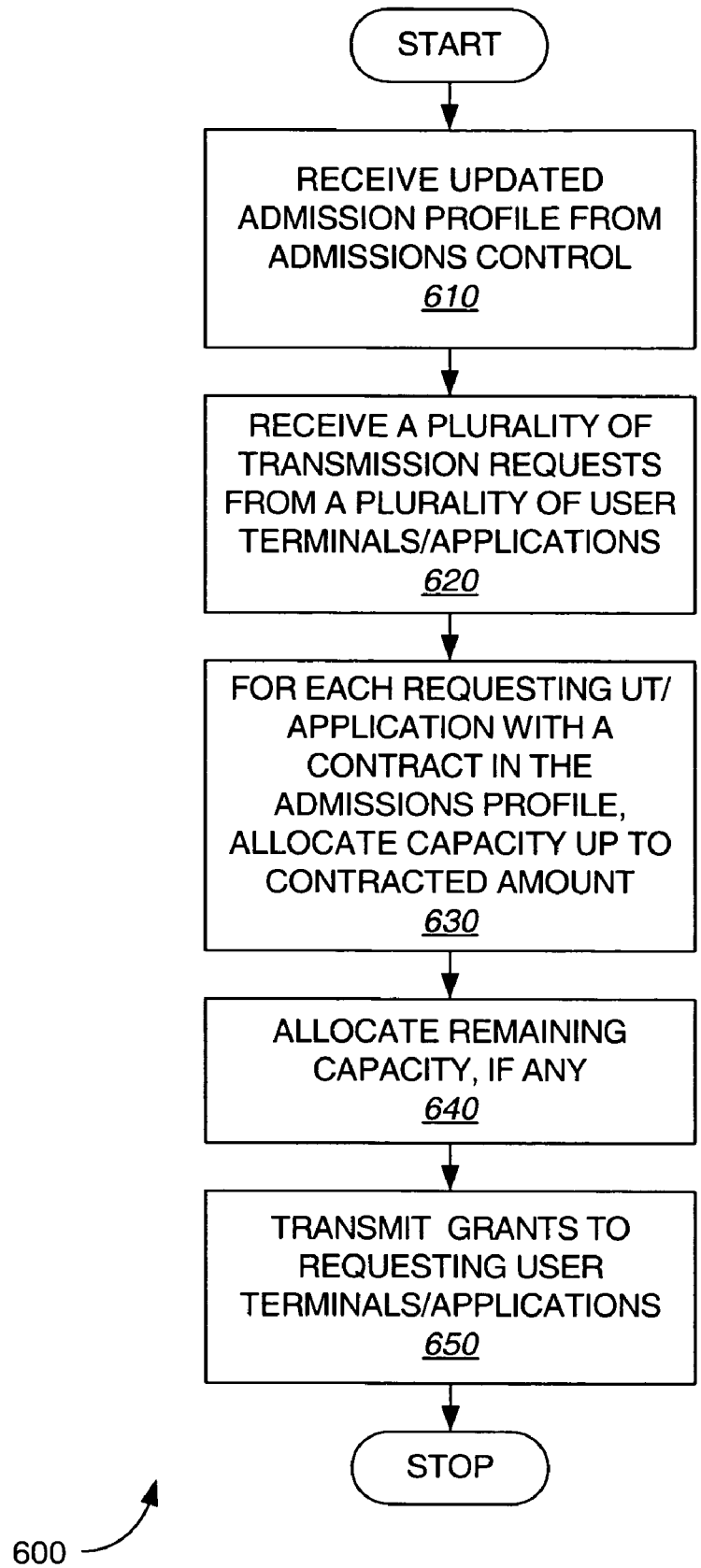
FIG. 6 is a flowchart of a generalized embodiment of a scheduler method.
Figure 7:
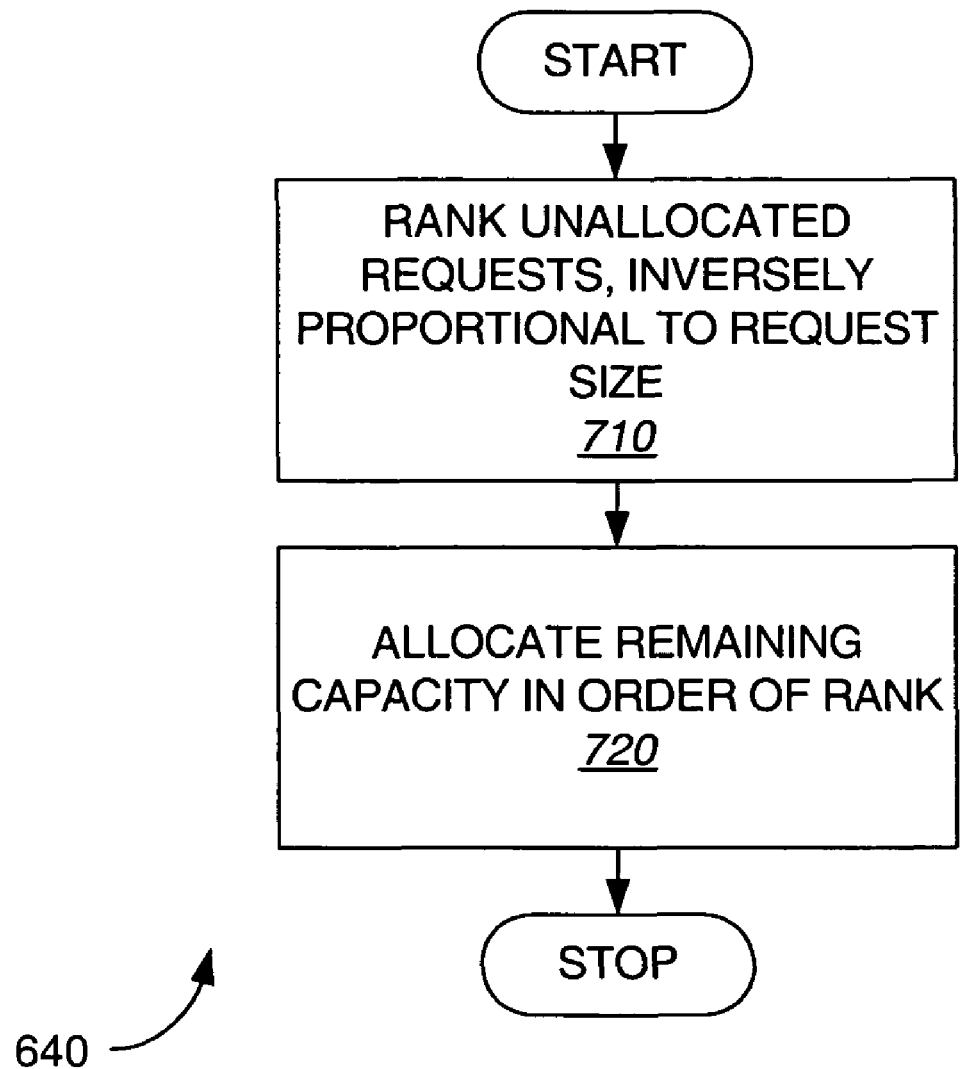
FIG. 7 depicts an alternate method for allocating remaining capacity subsequent to QoS scheduling.
Figure 8:
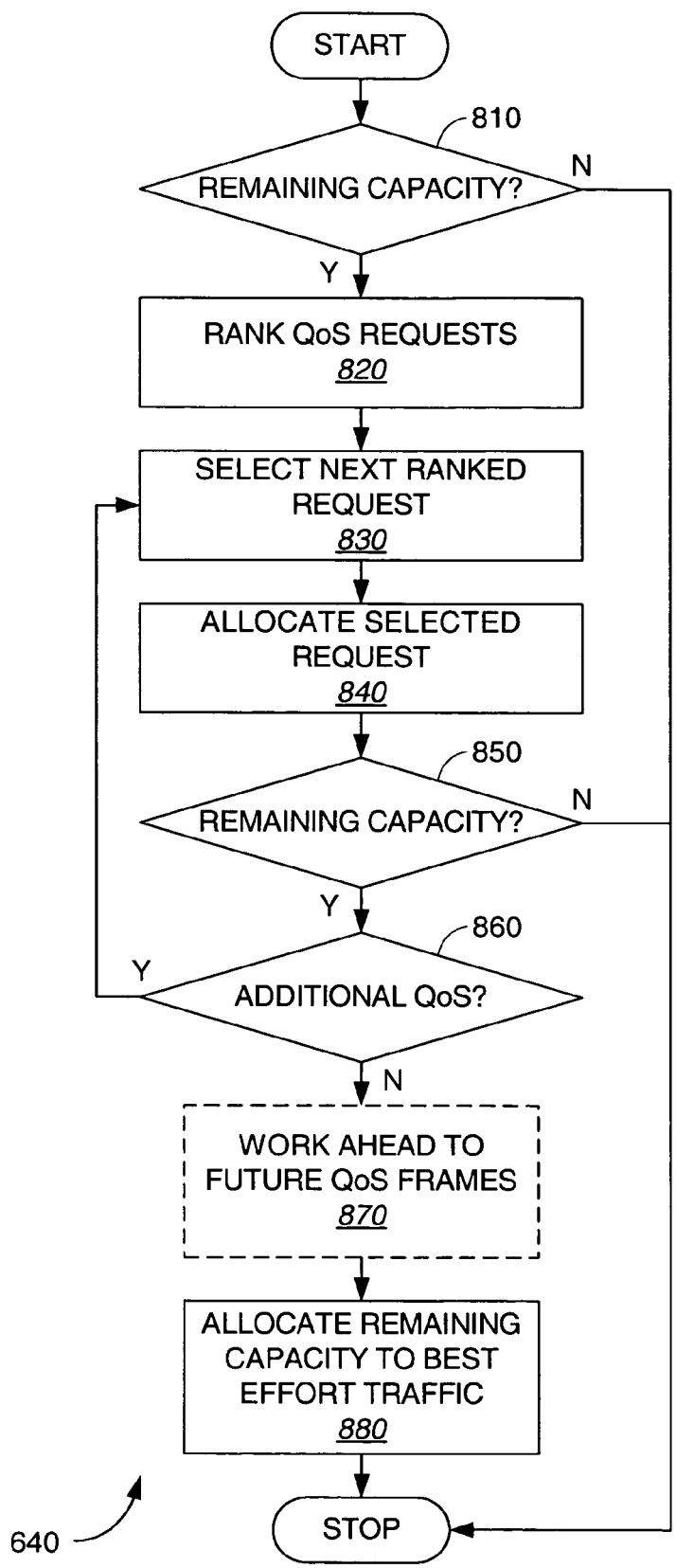
FIG. 8 depicts an alternate method for allocating remaining capacity subsequent to QoS scheduling when some information about the data classes is known.

A flowchart of a generalized embodiment of a scheduler method 600 is depicted in FIG. 6. Method 600 may be used for the basic scenario described above, scenarios in which more advanced knowledge of data classes is available, or any combination thereof. FIG. 7 further details an option of block 640, suitable for use when class type is not known. FIG. 8 further details an option of block 640, suitable when class type is known. FIG. 8 also illustrates other aspects of the present invention.

Method 600 starts in block 610, where an updated admissions profile from the admissions control unit is received. As described above with respect to FIG. 5, the admissions profile may simply be stored in a shared memory, such that the admissions control unit and the scheduler have access to it. In an alternate embodiment, updates to the admission profile are transmitted, and the updates are incorporated into the current state of the admissions profile available to the scheduler. Note that commitments for QoS flow capacity may be added or removed over time.

In block 620, the scheduler receives a plurality of transmission requests from a plurality of user terminals and/or applications (i.e. received via network 140). In block 630, for each requesting UT/application with a contract in the admissions profile, allocate capacity up to the contracted amount. In the example embodiment, each UT/application may have a contracted number of OFDM symbols reserved for transmission in the current frame (an example of which is described above with respect to FIG. 4). Note that an allocation associated with this block 630 may not satisfy the entire requested amount of data. This is due to the fact that variable-rate data sources often generate more data than the average amount that may have been used for contracting. In addition, degradation of the wireless channel may require additional capacity (i.e. OFDM symbols, time slots, power, etc.) to transmit a desired amount of data.

In block 640, if additional capacity remains for allocation, it may be divided among any remaining unsatisfied requests. Alternatives for block 640 are depicted in FIGS. 7 and 8, described further below. In one embodiment, remaining capacity may be allocated using any number of best effort type strategies. For example, capacity may be allocated in round-robin fashion among the remaining requests. In an alternate embodiment, those UTs/applications with contracted QoS allocations in a frame may be given priority for remaining BET allocation, under the theory that some or all of the remainder of their request, not allocated in block 630, may be QoS data that exceeded the contracted allocation. Other fairness criteria may be employed for allocating the remainder. Additional levels of prioritization may be deployed, such that some UTs/applications are given priority in BET allocation over others. Any combination of these techniques may be deployed. Additional options are detailed below.

Those of skill in the art will readily extend the teachings herein to additional classes, and combinations of types of classes. For example, for clarity of discussion, various embodiments described herein have omitted describing RLC traffic, described above. In an example embodiment, RLC traffic may be the highest priority traffic, but may also require a relatively small amount of the overall capacity. As such, one method for accommodating this third, high-priority class of data is to allocate a small amount of capacity to each requesting UT for which RLC data may be a portion of the request. The remainder may then be allocated according to QoS or BET scheduling, as described herein. Clearly, if RLC traffic is identified in the request, or otherwise known (i.e. it is contained in a co-located queue), allocation can be made in a straightforward manner.

FIG. 7 depicts an alternate embodiment of block 640 for allocating remaining capacity subsequent to QoS scheduling. As an alternative to the various methods described above, the embodiment of block 640 depicted in FIG. 7 may be deployed to attempt to maximize the number of UTs/applications that have their request for transmission granted. In block 710, the requests that were unallocated, or only partially allocated, in block 630, described above, are ranked, with the highest rank inversely proportional to the request size (or remaining portion thereof). In block 720, the remaining capacity is allocated to requests in order of highest rank. If the final allocation can not be made fully due to lack of capacity, that request will be partially allocated. Thus, the maximum number of requests that can be accommodated are satisfied with this method. This embodiment may be used in conjunction with various techniques described above.

As described above, when the scheduler has knowledge of the type of data associated with a request, or in a queue, that information may be incorporated in the scheduling decision. To illustrate this principle, consider the following example. An active flag is maintained for each QoS flow managed by the scheduler. In any given frame, the active flag is set for all admitted QoS flows that have a nominal allocation of slots within that frame (as in the example of FIG. 4). All QoS flows with their active flag set are serviced first in a current MAC frame. Other QoS flows may or may not receive service in the current MAC frame, depending upon whether there are any unused $F_R$ resources. In this example, $F_R$ may be a limit on the amount of capacity reserved for QoS services, as described above, and $F_B$ may be reserved for best effort traffic. It will be clear that $F_R$ may be set to the entire capacity, if desired. When the scheduler knows whether one or more partially allocated requests contain QoS data, and other requests are directed to best effort traffic, the scheduler may give priority to remaining QoS traffic. It may also be desirable for the scheduler to "work ahead", when a portion of $F_R$ is not fully allocated, in order to reduce future loading. Using this option to preempt current BET requests may be appropriate when a limited portion of the capacity, $F_R$, is allocated to QoS service. However, working ahead (detailed below) may be performed whenever unallocated capacity remains.

In this example, active QoS sensitive flows are segmented into two groups: those with positive flow margin $D^+$, and those with negative flow margin, $D^-$:

$$i \in D^-, \text{ if } \phi(i) > \hat{\phi}(i) \quad (8)$$

$$i \in D^+, \text{ if } \phi(i) \leq \hat{\phi}(i) \quad (9)$$

Flows in $D^+$ do not experience outage since their flow requirement is less than or equal to their allocation. In addition, flows in $D^+$ that have positive flow margin contribute to a pool of unused slots, M, that can be made available to other QoS flows in a prioritized manner. Flows in $D^-$ may or may not receive their requirement, depending on whether unused resources are available.

If $D^-$ is not empty, then any unused slots may be made available to flows in this group first. There are a number of ways to handle the allocation of unused slots to active QoS flows in $D^-$. The objective, in this example, is to maximize the number of flows meeting their QoS requirements. This is accomplished by rank ordering the flows in $D^-$ based on their flow margins, $m_i$. That is, the flow with the smallest $|m_i|$ receives the highest rank. Note that $m_i$ belonging to $D^-$ implies that $m_i$ is a negative value.

In this example, the scheduler allocates the minimum number of slots from the excess margin pool to allow the highest rank flow in $D^-$ to achieve its requirement, $\phi(i)$. This procedure is iterated until the excess margin pool is exhausted or all active QoS flows are served. If the last QoS flow considered is not fully satisfied, it may be given a partial allocation. Flows that are not fully satisfied may experience degraded service. This example may result in a flow not receiving its allocation. In such a case, a buffer overflow may occur and packets may be lost. To prevent this, buffer overflow from QoS queue for a given flow may be placed in the front of that user's best-effort queue.

If, after serving all active flows, there are unused slots, the remainder of $F_R$ may be made available to the group of QoS flows that have data in their QoS queues but do not have the active flag set for the current frame. This "work ahead" scheduling capability, introduced earlier, is typically performed when the scheduler has access to data to be transmitted in the future, i.e. data intended to be transmitted in the next frame or frames. In one embodiment, the access point both houses the scheduler and maintains queues for forward link data. Thus, the scheduler may work ahead, if desired, when appropriate. In an example embodiment where the reverse link data requests are scheduled for QoS based solely on the admission profile (as described above), the scheduler may not know about future data in the user terminal, and, as such, only performs work ahead on the forward link. For such a reverse link, the scheduler does not distinguish between QoS and BET data beyond that which has been scheduled in the MAC frame (according to the admission profile). That is, once the QoS traffic for a given flow has been given its requirement on the reverse link segment, the remainder of that UT's data is considered by the scheduler to be BET traffic. Those of skill in the art will recognize how to adapt this principle to either the forward link or reverse link, and for any location of the scheduler. In particular, this scheduler may be at a designated UT which provides scheduling for managed peer-to-peer connections using the procedures described above. Note additionally, that, from the perspective of the UT, in this example, data may be arranged in any way desired in the UT queue (e.g. work-ahead QoS data may be placed in front of the UT's BET queue). Thus, the UT may perform work ahead, if desired, even when the scheduler does not.

The allocation of unused slots to the inactive forward link QoS flows (work ahead) may be done as follows. Inactive forward link QoS flows are prioritized in order of their phase parameter. That is, inactive forward link flows that become active in the next MAC frame receive the highest priority. Flows within this phase group are prioritized in a way that maximizes the number of flows satisfied (as described above). Thus, inactive flows with the least amount of data in their queue are served first. The scheduler continues to provide work ahead to those inactive QoS flows until all the slots in $F_R$ are occupied, or all QoS queues are emptied.

FIG. 8 depicts an alternate embodiment of block 640 for allocating remaining capacity subsequent to QoS scheduling when some information about the data requested for transmission (or co-located in a queue) is known. This embodiment is compatible with the example of positive and negative flow margins, just described, and work ahead may optionally be deployed as well.

The process begins in decision block 810. If there is no remaining capacity to be allocated, the process stops. If there is remaining capacity, proceed to block 820. In block 820, the QoS requests are ranked. Various rankings may be contemplated. In the example embodiment, in order to serve the most requests, the requests are ranked inversely according to size.

In block 830, the next highest ranked request is selected (the highest rank for the first iteration). In block 840, remaining capacity is allocated to the selected request. If the remainder of the request is greater than the remaining capacity, the remainder of the capacity will be allocated. In decision block 850, if the remaining capacity has been exhausted, the process may stop. If capacity remains, proceed to decision block 860.

In decision block 860, if there are additional QoS requests remaining unallocated, return to block 830, select the next highest ranked request, and repeat the process just described. If all the QoS requests have been processed, proceed to block 870.

Block 870 is depicted with a dashed outline to indicate that work ahead is optional. If desired, the scheduler may work ahead to future QoS frames. An example method for performing such work ahead is described above.

In block 880, any remaining capacity is allocated to best effort traffic. Any best effort method may be deployed. In an example embodiment, best effort traffic is served using a round-robin scheduling method. Such an approach does not provide for QoS differentiation across different user terminals, or across multiple flows associated with a given user. However, as described above, a user terminal is free to prioritize the packets in its queue to accommodate whatever QoS scheme it desires. If additional levels of inter-user prioritization are desired, signaling may be deployed to allow the scheduler to assist in such prioritization, as will be apparent to one of skill in the art.

It should be noted that in all the embodiments described above, method steps can be interchanged without departing from the scope of the invention. The descriptions disclosed herein have in many cases referred to signals, parameters, and procedures associated with a MIMO OFDM system, but the scope of the present invention is not limited as such. Those of skill in the art will readily apply the principles herein to various other communication systems. These and other modifications will be apparent to those of ordinary skill in the art.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A scheduler for scheduling data transmission in a communication system, the scheduler comprising:
   first logic embodied in hardware to determine if each of one or more remote devices corresponding to one or more data transmission indicators has a capacity commitment in an admission profile,
   wherein the admission profile is indicative of expected data requirements for flows already admitted, wherein the expected data requirements comprise an average value; and
   second logic embodied in hardware to allocate capacity in accordance with a data transmission indicator when a capacity commitment is found, wherein capacity is allocated for remote devices with capacity commitments in the admission profile limited to their capacity commitments before remaining capacity is allocated to any unsatisfied data transmission indicators, wherein the remaining capacity is allocated to unsatisfied indicators in order of increasing data size of an unallocated portion of the unsatisfied indicators.

2. The scheduler of claim 1, wherein each of a plurality of data transmission indicators is associated with one of a plurality of service levels.

3. The scheduler of claim 2, wherein the second logic allocates capacity in response to one or more transmission indicators associated with one or more of a first group of service levels in accordance with the admission profile, and allocates remaining capacity, if any, in response to one or more transmission indicators associated with one or more of a second group of service levels.

4. The scheduler of claim 3, wherein the first group comprises one or more quality of service guaranteed service levels.

5. The scheduler of claim 3, wherein the second group comprises one or more best effort service levels.

6. A communication device, operable with a plurality of remote devices, the communication device comprising:
   a scheduler for, during each of a plurality of time periods, for each of a plurality of data transmission indicators,
      determining if a remote device corresponding to the data transmission indicator has a capacity commitment in an admission profile,
      wherein the admission profile is indicative of expected data requirements for flows already admitted, wherein the expected data requirements comprise an average value, and wherein the admission profile includes the plurality of time periods and a capacity commitment for zero or more remote devices in each of the plurality of time periods, and for
      allocating capacity in accordance with the data transmission indicator when a capacity commitment is found, wherein capacity is allocated for remote devices with capacity commitments in the admission profile limited to their capacity commitments before remaining capacity is allocated to any unsatisfied data transmission indicators, wherein the remaining capacity is allocated to unsatisfied indicators in order of increasing data size of an unallocated portion of the unsatisfied indicators.

7. The communication device of claim 6, further comprising a receiver for receiving a request message comprising a data transmission indicator.

8. The communication device of claim 6, further comprising one or more data queues, a data transmission indicator generated with a presence of data within a queue.

9. The communication device of claim 6, further comprising a transmitter for transmitting one or more grant messages indicating the allocated capacity.

10. The communication device of claim 6, further comprising an admissions control unit for:
receiving a request for admission comprising flow parameters corresponding to a data flow from a remote device;
conditionally admitting the flow when the flow parameters, if combined with the admission profile, would not exceed a system capacity; and
modifying the admission profile to incorporate the flow upon admission.

11. The communication device of claim 6, wherein each remote device corresponds to a plurality of data transmission indicators, each indicator associated with a service level.

12. The communication device of claim 11, wherein the scheduler:
allocates capacity in response to one or more transmission indicators associated with one or more of a first group of service levels in accordance with the admission profile; and
allocates any remaining capacity in response to one or more transmission indicators associated with one or more of a second group of service levels.

13. The communication device of claim 12, wherein the first group comprises one or more quality of service guaranteed service levels.

14. The communication device of claim 12, wherein the second group comprises one or more best effort service levels.

15. The communication device of claim 11, wherein the scheduler:
allocates the remaining capacity, if any, in response to unsatisfied transmission indicators associated with a first service level; and
then allocates remaining capacity, if any, in response to transmission indicators associated with a second service level.

16. The communication device of claim 15, wherein the scheduler further allocates remaining capacity, if any, in response to transmission indicators for data in one or more future time periods associated with the first service level prior to the allocation in response to indicators associated with the second service level.

17. A communication system comprising:
a plurality of remote devices;
an admission profile,
wherein the admission profile is indicative of expected data requirements for flows already admitted, wherein the expected data requirements comprise an average value, and wherein the admission profile comprises a plurality of time periods and a capacity commitment for zero or more remote devices in each of the plurality of time periods; and
a communication device comprising a scheduler for, during each of the plurality of time periods, for each of a plurality of data transmission indicators, determining if a remote device corresponding to the data transmission indicator has a capacity commitment in the admission profile and for allocating capacity in accordance with the data transmission indicator when a capacity commitment is found, wherein capacity is allocated for remote devices with capacity commitments in the admission profile limited to their capacity commitments before remaining capacity is allocated to any unsatisfied data transmission indicators, wherein the remaining capacity is allocated to unsatisfied indicators in order of increasing data size of an unallocated portion of the unsatisfied indicators.

18. A method for scheduling, the method comprising:
receiving, at a device with a scheduler, one or more transmission requests from one or more remote devices; and
granting one or more of the transmission requests in accordance with an admission profile,
wherein the admission profile is indicative of expected data requirements for flows already admitted, wherein the expected data requirements comprise an average value, wherein the admission profile includes a capacity commitment for the one or more remote devices, and wherein capacity is allocated for remote devices with capacity commitments in the admission profile limited to their capacity commitments before remaining capacity is allocated to any unsatisfied data transmission indicators, wherein the remaining capacity is allocated to unsatisfied indicators in order of increasing data size of an unallocated portion of the unsatisfied indicators.

19. The method of claim 18, further comprising:
receiving a request for admission comprising flow parameters corresponding to a data flow from a remote device;
conditionally admitting the flow when the flow parameters, if combined with the admission profile, would not exceed a system capacity; and
modifying the admission profile to incorporate the flow upon admission.

20. A method for scheduling, the method comprising:
determining, at a device with a scheduler, for each of a plurality of time periods and for each of a plurality of data transmission indicators, whether a remote device corresponding to the data transmission indicator has a capacity commitment in an admission profile,
wherein the admission profile is indicative of expected data requirements for flows already admitted, wherein the expected data requirements comprise an average value; and
allocating capacity in accordance with the data transmission indicator when a capacity commitment is in the admission profile, wherein capacity is allocated for remote devices with capacity commitments in the admission profile limited to their capacity commitments before remaining capacity is allocated to any unsatisfied data transmission indicators, wherein the remaining capacity is allocated to unsatisfied indicators in order of increasing data size of an unallocated portion of the unsatisfied indicators.

21. The method of claim 20, wherein one or more of the data transmission indicators are received from one or more remote devices.

22. The method of claim 20, wherein one or more of the data transmission indicators are generated in response to a presence of data within a queue.

23. The method of claim 20, wherein each of the plurality of data transmission indicators corresponds to one of a plurality of service levels.

24. The method of claim 23, wherein capacity is allocated first for data transmission indicators corresponding to a first service level, and the remaining capacity, if any, is allocated to transmission indicators corresponding to one or more second service levels.

25. A method for scheduling, the method comprising:
receiving, at a device with a scheduler, a plurality of transmission indicators corresponding to a plurality of remote devices;

accessing an admissions profile to determine if one or more transmission indicators have an associated commitment in the admissions profile, wherein the admission profile is indicative of expected data requirements for flows already admitted, wherein the expected data requirements comprise an average value;

allocating capacity according to the remote devices with located commitments limited to their capacity commitments before allocating remaining capacity to any unsatisfied transmission indicators;

allocating remaining capacity to unsatisfied indicators in order of increasing data size of an unallocated portion of the unsatisfied indicators; and transmitting one or more grant messages in accordance with the capacity allocation.

26. A device comprising:

means for receiving one or more transmission requests from one or more remote devices; and means for granting one or more of the transmission requests in accordance with an admission profile, wherein the admission profile is indicative of expected data requirements for flows already admitted, wherein the expected data requirements comprise an average value, wherein the admission profile includes a capacity commitment for the one or more remote devices, and wherein capacity is allocated for remote devices with capacity commitments in the admission profile limited to their capacity commitments before remaining capacity is allocated to any unsatisfied data transmission indicators, wherein the remaining capacity is allocated to unsatisfied indicators in order of increasing data size of an unallocated portion of the unsatisfied indicators.

27. The device of claim 26, wherein the admission profile comprises a plurality of frames, and zero or more capacity values associated with a remote device per frame.

28. The device of claim 26, wherein the admission profile is created in accordance to a duty factor and a frame phase for one or more data flows.

29. The device of claim 26, further comprising:

means for receiving a request for admission comprising flow parameters corresponding to a data flow from a remote device;

means for conditionally admitting the flow when the flow parameters, if combined with the admission profile, would not exceed a system capacity; and means for modifying the admission profile to incorporate the flow upon admission.

30. A communication system comprising:

means for determining, at a device with a scheduler, for each of a plurality of time periods and for each of a plurality of data transmission indicators, whether a remote device corresponding to the data transmission indicator has a capacity commitment in an admission profile, wherein the admission profile is indicative of expected data requirements for flows already admitted, wherein the expected data requirements comprise an average value; and means for allocating capacity in accordance with the data transmission indicator when a capacity commitment is in the admission profile, wherein capacity is allocated for remote devices with capacity commitments in the admission profile limited to their capacity commitments before remaining capacity is allocated to any unsatisfied data transmission indicators, wherein the remaining capacity is allocated to unsatisfied indicators in order of increasing data size of an unallocated portion of the unsatisfied indicators.

31. A non-transitory computer-readable medium embodying executable instructions for:

receiving one or more transmission requests from one or more remote devices; and granting one or more of the transmission requests in accordance with an admission profile, wherein the admission profile is indicative of expected data requirements for flows already admitted, wherein the expected data requirements comprise an average value, wherein the admission profile includes a capacity commitment for the one or more remote devices, and wherein capacity is allocated for remote devices with capacity commitments in the admission profile limited to their capacity commitments before remaining capacity is allocated to any unsatisfied data transmission indicators, wherein the remaining capacity is allocated to unsatisfied indicators in order of increasing data size of an unallocated portion of the unsatisfied indicators.

32. The non-transitory computer-readable medium of claim 31, further comprising instructions for:

receiving a request for admission comprising flow parameters corresponding to a data flow from a remote device;

conditionally admitting the flow when the flow parameters, if combined with the admission profile, would not exceed a system capacity; and modifying the admission profile to incorporate the flow upon admission.

33. A non-transitory computer-readable medium embodying executable instructions for:

determining, at a device with a scheduler, for each of a plurality of time periods and for each of a plurality of data transmission indicators, whether a remote device corresponding to the data transmission indicator has a capacity commitment in an admission profile, wherein the admission profile is indicative of expected data requirements for flows already admitted, wherein the expected data requirements comprise an average value; and allocating capacity in accordance with the data transmission indicator when a capacity commitment is in the admission profile, wherein capacity is allocated for remote devices with capacity commitments in the admission profile limited to their capacity commitments before remaining capacity is allocated to any unsatisfied data transmission indicators, wherein the remaining capacity is allocated to unsatisfied indicators in order of increasing data size of an unallocated portion of the unsatisfied indicators.

* * * * *